(12) United States Patent
Schmitt (10) Patent No.: US 8,132,843 B2
(45) Date of Patent: Mar. 13, 2012

(54) FOLDING TOP COMPARTMENT LID

(75) Inventor: Hans-Jürgen Schmitt, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 202 days.

(21) Appl. No.: 12/560,525

(22) Filed: Sep. 16, 2009

(65) Prior Publication Data

US 2010/0066117 A1    Mar. 18, 2010

(30) Foreign Application Priority Data

Sep. 16, 2008   (DE) .................. 10 2008 047 285

(51) Int. Cl.
*B60J 7/20* (2006.01)
(52) U.S. Cl. .......... 296/136.05; 296/107.08; 296/136.06
(58) Field of Classification Search .................. 296/121, 296/128, 107.08, 136.05, 136.06
See application file for complete search history.

(56) References Cited

U.S. PATENT DOCUMENTS

| | | | |
|---|---|---|---|
| 5,533,777 A | | 7/1996 | Kleemann et al. |
| 6,168,224 B1 | | 1/2001 | Henn et al. |
| 6,254,165 B1 | * | 7/2001 | Neubrand ........................ 296/76 |
| 6,811,206 B2 | * | 11/2004 | Wagner .................... 296/136.05 |
| 6,824,194 B2 | * | 11/2004 | Weissmueller et al. .. 296/136.05 |
| 7,237,823 B2 | * | 7/2007 | Bruder et al. ............ 296/107.08 |
| 7,261,363 B2 | * | 8/2007 | Obendiek ................ 296/107.08 |
| 7,497,499 B2 | * | 3/2009 | Halbweiss et al. ............ 296/128 |
| 2011/0095560 A1 | * | 4/2011 | Schmitt ..................... 296/107.08 |

FOREIGN PATENT DOCUMENTS

| | | |
|---|---|---|
| DE | 4336278 A1 | 4/1995 |
| DE | 19960905 C1 | 5/2001 |
| DE | 10160406 A1 | 6/2003 |
| DE | 10156011 C2 | 9/2003 |
| DE | 10339816 A1 | 4/2005 |
| EP | 0933242 A1 | 8/1999 |
| EP | 0846584 B1 | 9/2001 |
| EP | 1318041 A1 | 6/2003 |

OTHER PUBLICATIONS

German Search Report dated Jun. 16, 2009.

* cited by examiner

*Primary Examiner* — Jason S Morrow (57) ABSTRACT

A folding top compartment lid, in particular a folding top compartment lid with an integrated engine bay lid, is pivoted into an open position and into a closed position by a so-called four-bar hinge arrangement. An actuating device is articulatedly connected to a rear and a front setting-out lever of the four-bar hinge mechanism, which actuating device is coupled to a locking device which contains locking hooks. The actuating device with the setting-out levers can be activated by a hydraulic cylinder so as to pivot into the open and closed positions in such a way that the folding top compartment lid can be moved from the locked closed position into an unlocked open position and back from the open position into the closed position.

11 Claims, 6 Drawing Sheets

FOLDING TOP COMPARTMENT LID

CROSS-REFERENCE TO RELATED APPLICATION

This application claims the priority, under 35 U.S.C. §119, of German application DE 10 2008 047 285.9, filed Sep. 16, 2008; the prior application is herewith incorporated by reference in its entirety.

BACKGROUND OF THE INVENTION

Field of the Invention

The invention relates to a folding top compartment lid, in particular a folding top compartment lid with an integrated engine bay lid, for a rear-end folding top compartment for holding a stowed folding top of a cabriolet vehicle. It being possible for the folding top compartment lid to be adjusted into an open position and into a closed position by a four-bar hinge mechanisms on each side of the folding top compartment, and with the four-bar hinge mechanisms being arranged between a body-side bearing block and a holding support for the folding top compartment lid, and with a locking device being provided.

European patent EP 0 846 584 B1, corresponding to U.S. Pat. No. 6,168,224, discloses a folding top compartment lid for a motor vehicle, in particular for a cabriolet vehicle, which folding top compartment lid can be pivoted into an open position and into a closed position by setting-out levers which form a so-called four-bar hinge mechanism. By an integrated locking device which interacts with the setting-out levers, the closed position of the folding top compartment lid is secured by a locking hook.

SUMMARY OF THE INVENTION

It is accordingly an object of the invention to provide a folding top compartment lid, which overcomes the above-mentioned disadvantages of the prior art devices of this general type, which can be moved into an open position and into a closed position both when the vehicle is at a standstill and when the vehicle is traveling. It is also sought to ensure secure locking in the closed state of the folding top compartment lid, wherein consistent joints between the folding top compartment lid and the vehicle body should be formed after every actuating process.

With the foregoing and other objects in view there is provided, in accordance with the invention, a folding top compartment lid for a rear-end folding top compartment for holding a stowed folding top of a cabriolet vehicle. The folding top compartment lid contains four-bar hinge mechanisms. One of the four-bar hinge mechanisms is disposed on each side of the folding top compartment lid for adjusting the folding top compartment lid into an unlocked open position and into a locked closed position. The four-bar hinge mechanisms are each disposed between a body-side bearing block and a holding support for the folding top compartment lid. The four-bar hinge mechanisms each have a rear setting out lever and a front setting out lever. A locking device having locking hooks and a hydraulic actuating cylinder are provided. An actuating device is articulatedly connected to the rear and front setting-out levers of the four-bar hinge mechanism. The actuating device is coupled to the locking device. The actuating device with the rear and front setting-out levers are activated by the hydraulic actuating cylinder so as to pivot into the unlocked open and locked closed positions in such a way that the folding top compartment lid can be moved from the locked closed position into the unlocked open position and back from the unlocked open position into the locked closed position.

The advantages obtained by the invention are inter alia that, as a result of the integration of the greatest possible number of functional elements of the adjusting arrangement, the components of the mechanism can be optimally adapted with respect to one another, and secure locking of the folding top compartment lid in the vehicle is also ensured.

This is achieved in that an actuating device is articulatedly connected to a rear and a front setting-out lever of the four-bar hinge mechanism, which actuating device is coupled to a locking device which contains locking hooks, and with it being possible for the actuating device with the setting-out levers to be activated by a hydraulic cylinder so as to pivot into the open and closed positions in such a way that the folding top compartment lid can be moved from the locked closed position into an unlocked open position and back from the open position into the closed position.

In one embodiment of the invention, the actuating device contains an actuating lever which is connected to an angle lever and which is formed in a pivotable manner on the rear setting-out lever, with the angle lever being mounted on a bearing block at a bearing point. The actuating device is operatively connected to the locking device which, according to the invention, contains two locking hooks which are pivotably arranged one behind the other on the bearing block and which are connected to one another by a coupling rod so as to be movable synchronously or in a superposable fashion, with the locking hooks, in the closed position, being arranged corresponding to locking pins on the holding support.

In one embodiment of the invention, for the actuation of the locking device, it is provided that the angle lever of the actuating device has a curved slotted-guide track for a guide pin on the rear locking hook. The curved slotted-guide track is arranged on an edge side, which is remote from the bearing point on the bearing block, of the angle lever, wherein in the closed position of the locking hook, the guide pin is arranged at the upper end of the vertically extending slotted-guide track, and in the open position, the guide pin is arranged at the lower end of the horizontally extending slotted-guide track. By this configuration of the angle lever with the slotted-guide track and the coupling to a rear locking hook, unlocking or locking is initiated and carried out in a simple manner when the open position of the folding top compartment lid is assumed, with the locking hook being moved synchronously by the coupling rod.

The pivoting of the folding top compartment lid into the open or closed position is effected by the hydraulic actuating cylinder, with the conversion of the movement of the four-bar hinge mechanisms being achieved according to the invention in that the rear setting-out lever of the four-bar hinge mechanism has, at its free end which is remote from the holding support, a fork head which is articulatedly connected so as to be pivotable about an axis in the bearing block, and a fork arm is pivotably connected to the actuating lever of the actuating device, which fork arm is articulatedly connected to the angle lever at the bearing point. The hydraulic actuating cylinder is supported on the bearing block in a positionally fixed manner at a bearing point and is connected with its deployable cylinder rod to the angle lever at a further bearing point. In the exemplary embodiment, for the pivoting of the folding top compartment lid, the rear setting-out levers of the four-bar hinge mechanism are driven; it would however alternatively also be possible for the front setting-out levers to be driven.

In order that an effective introduction of force can take place from the hydraulic actuating cylinder into the four-bar hinge mechanisms, it is provided according to the invention that, in the closed position, the bearing point for the actuating cylinders on the angle lever lies above the point of articulation of the actuating lever on the angle lever and—in relation to the direction of travel—behind the point of articulation of the front setting-out lever, which is at the same time the point of articulation of the angle lever on the bearing block.

To fix the four-bar hinge mechanisms in the transverse direction, it is provided according to the invention that a run-on wedge is arranged on the front setting-out lever, which run-on wedge, in the closed position, is situated opposite a corresponding run-on surface on the bearing block. In this way, the appearance of the joint between the folding top compartment lid and the vehicle body can be kept consistent and narrow. In particular, the run-on wedge ensures that the lid runs in smoothly when the vehicle is traveling.

It is also provided according to the invention that, in the closed position, the two setting-out levers are arranged so as to partially lie one above the other, and to move into the open position, the angle lever can be rotated about the bearing point on the bearing block by the actuating cylinder so as to drive the actuating lever and the rear setting-out lever, and the rear locking hook is configured such that it can be unlocked, or locked in order to assume the closed position, while synchronously driving the front locking hook via the coupling rod. It is thereby ensured that, when the folding top compartment lid is in a closed position, synchronous or superposed locking at the front and at the rear can take place by the locking hooks which are arranged one behind the other in the longitudinal direction of the vehicle, and also that synchronous unlocking takes place during an opening movement of the folding top compartment lid.

Since the angle lever with the actuating lever passes through the extension position, the locking hooks can be locked/unlocked without any perceptible movement of the lid. It is thereby practically achieved, in part, that the locking/unlocking and actuation of the folding top compartment lid are decoupled, and the first part of the cylinder movement is utilized to lock/unlock the folding top compartment lid.

A rubber bumper is arranged at the front of the bearing block on a support block, which rubber bumper faces toward the holding support and the folding top compartment lid. At the rear end, the folding top compartment lid is provided with at least one centering element (for example bracket) which engages into a receiving part arranged on the vehicle body and thereby positions the folding top compartment lid correctly in the Y-direction.

Other features which are considered as characteristic for the invention are set forth in the appended claims.

Although the invention is illustrated and described herein as embodied in a folding top compartment lid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
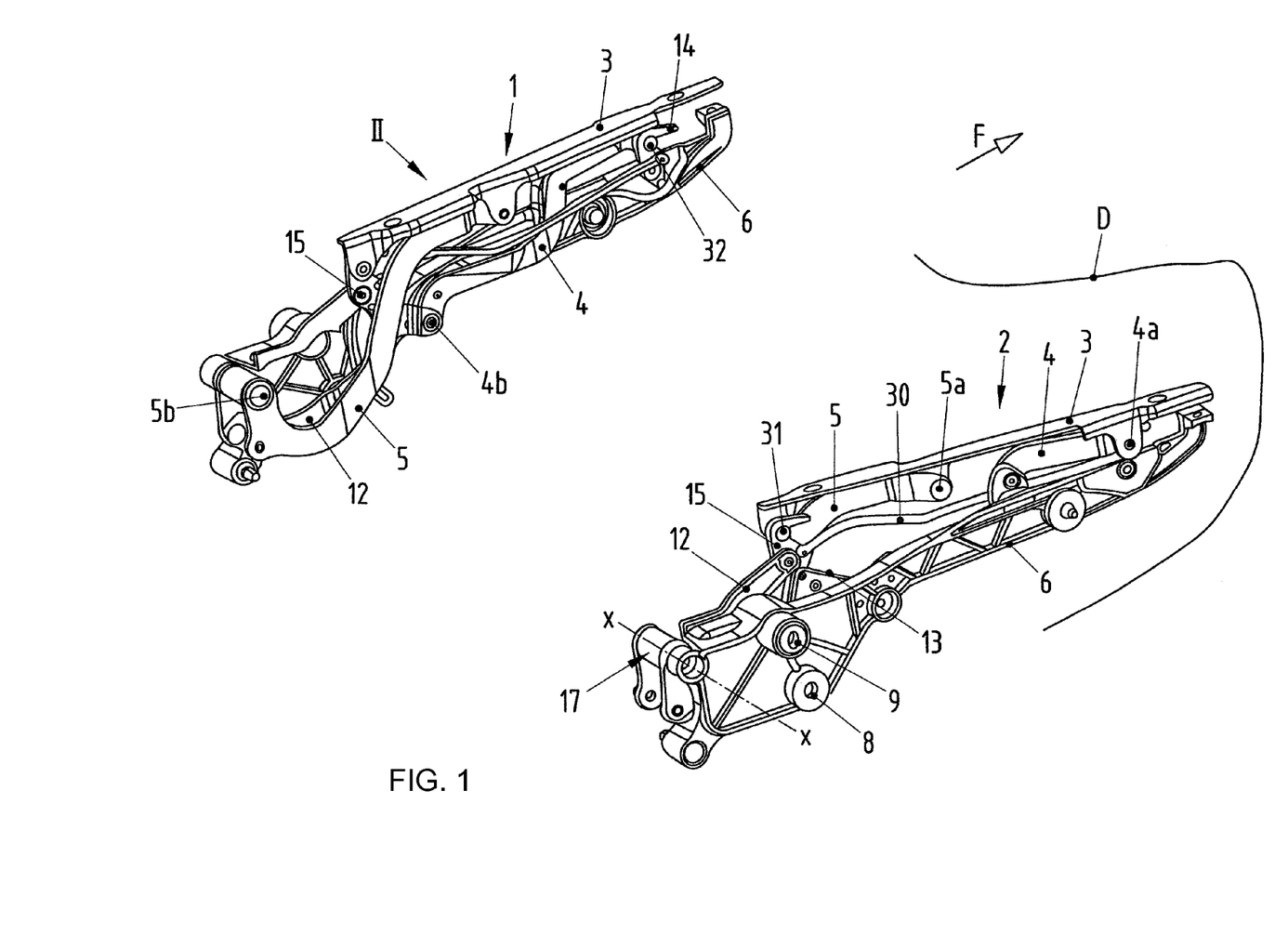
FIG. 1 is a diagrammatic, perspective view of two hinge units of a folding top compartment lid according to the invention.
Figure 2:
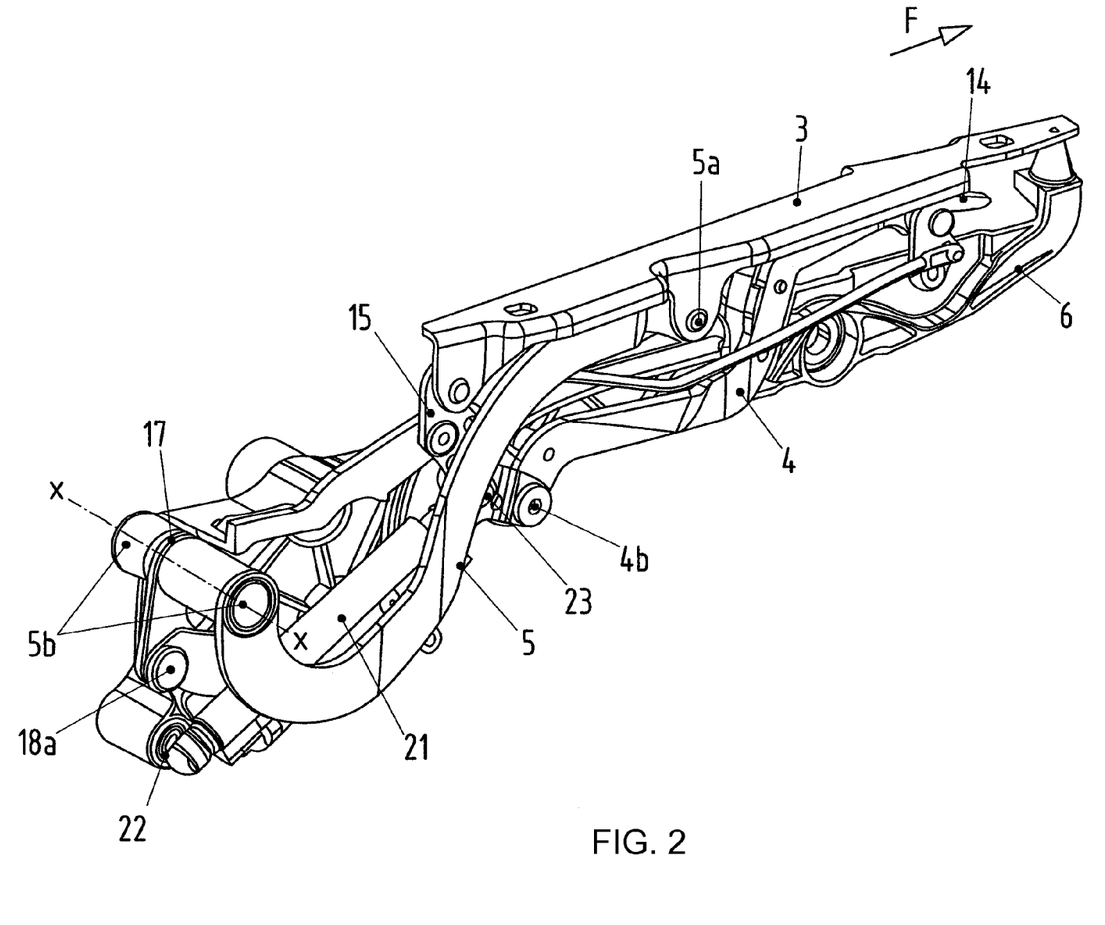
FIG. 2 is a diagrammatic, perspective view of a hinge unit having a hydraulic cylinder, in a closed position.

Referring now to the drawings of the invention in detail, and first in particular to FIG. 1 thereof, there is shown a folding top compartment lid D (merely indicated) for a cabriolet vehicle that can be moved into an open position I and into a closed position II by two hinge units 1, 2 which are spaced apart from one another in the transverse direction. The hinge unit 1, 2 contains a holding support 3 which is connected to the folding top compartment lid D and to which are articulatedly connected a front and a rear setting-out lever 4, 5 at bearing points 4a and 5a. The setting-out levers 4, 5 are pivotably held on a bearing block 6 at bearing points 4b and 5b.

The bearing block 6 is connected to the vehicle body by at least three fastening points 7, 8 and 9. The setting-out levers 4, 5 form, with the holding support 3 and the bearing block 6, a so-called four-bar hinge mechanism which is coupled in terms of movement to an actuating device 10 and to a locking device 11. The actuating device 10 substantially contains an actuating lever 12 and an angle lever 13, with the locking device 11 having two locking hooks 14, 15 which are arranged one behind the other in the vehicle longitudinal direction.

Figure 6:
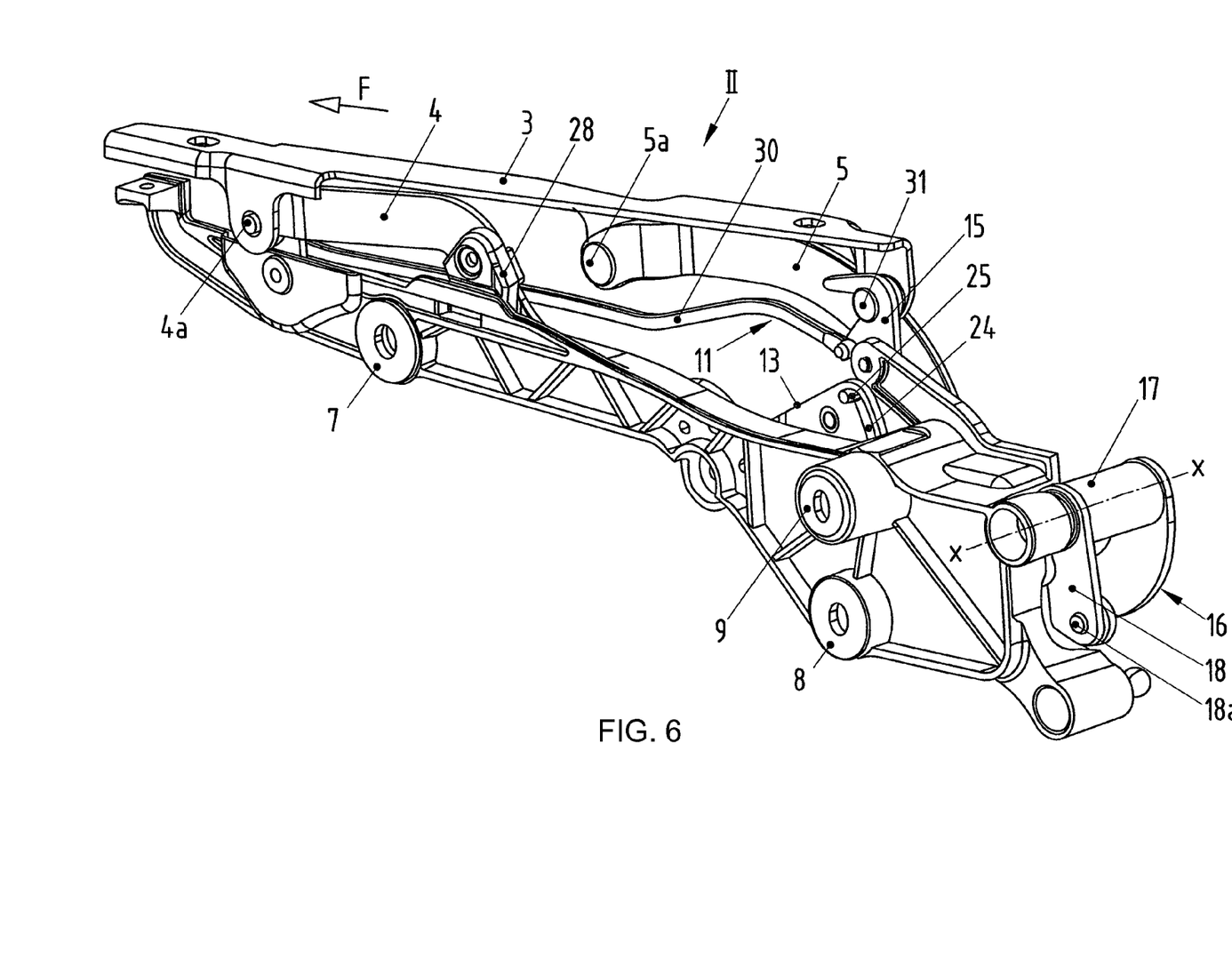
FIG. 6 is a perspective view of the hinge unit from the rear, in the closed position.

The rear setting-out lever 5 of the hinge unit 1, 2 has, at its free end 16 which is remote from the holding support 3, a fork head 17 (FIGS. 4 and 6) with a fork arm 18 which, in the closed position II, is aligned downwards. The actuating device 10 is articulatedly connected to the fork arm 18 about a point of articulation 18a at the end of the actuating lever 12, which actuating device 10 is in turn connected to the angle lever 13. A pivoting movement of the rear setting-out lever 5 takes place about the x-x axis (FIG. 6) at the bearing point 5b on the bearing block 6.

Figure 3:
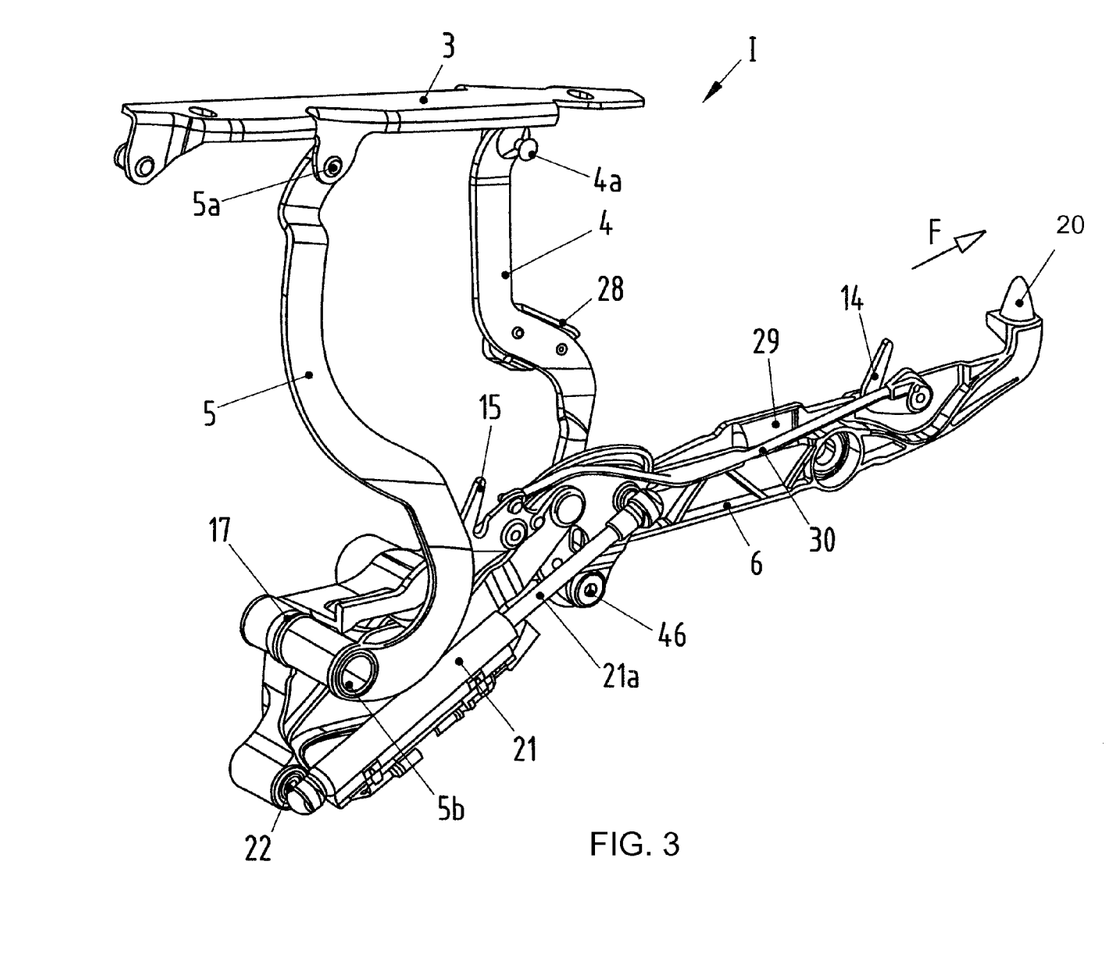
FIG. 3 is a diagrammatic, perspective view of the hinge unit having a hydraulic cylinder, in an open position.
Figure 4:
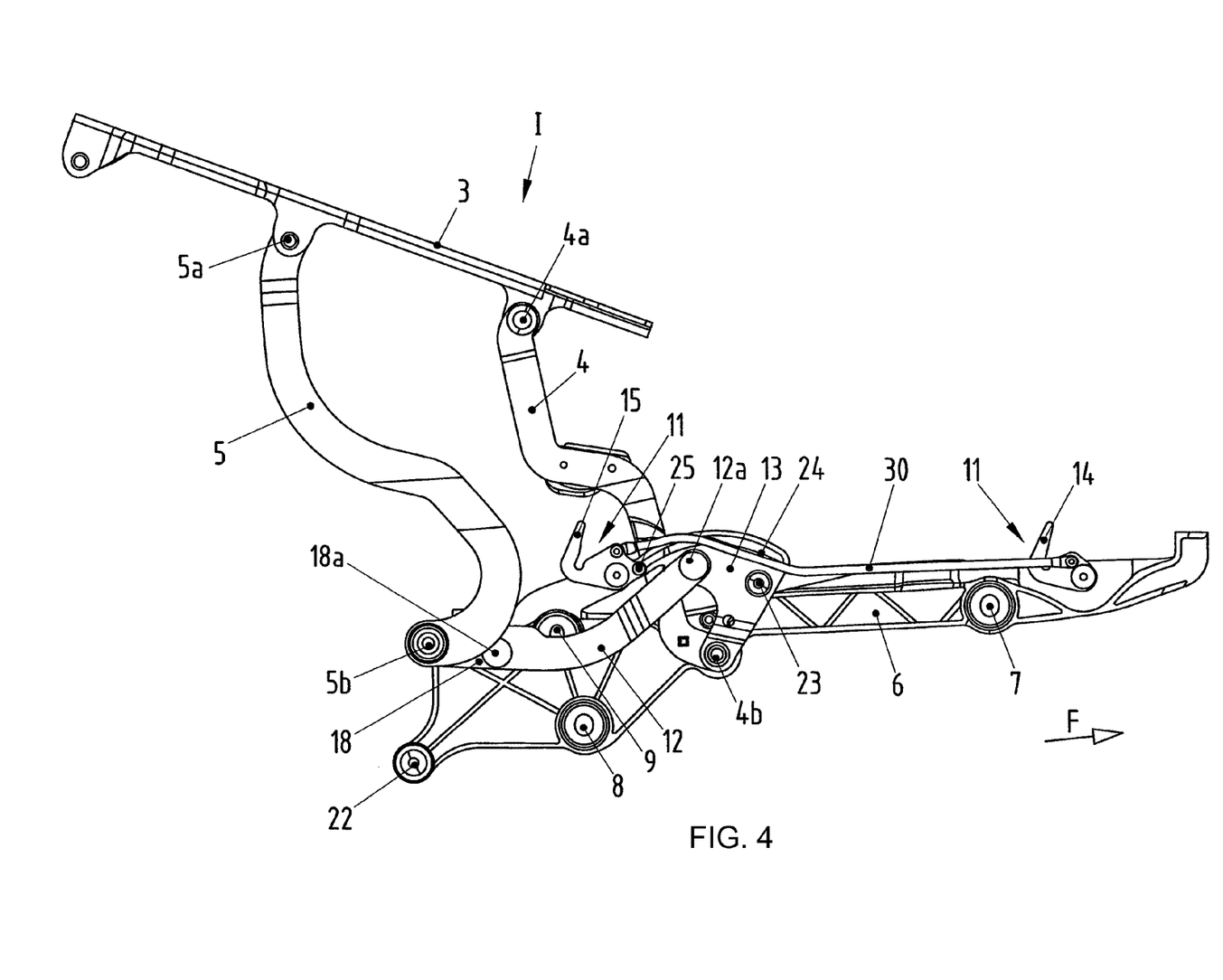
FIG. 4 is a side view of the hinge unit, illustrating a four-bar hinge mechanism and an actuating device and also a locking device, in the open position.

The angle lever 13 is pivotably articulatedly connected at the bearing point 4b of the bearing block 6 and is pivoted by a hydraulic actuating cylinder 21 which is supported on the bearing block 6 at bearing point 22 and on the angle lever 13 at bearing point 23 (FIGS. 3 and 4). The angle lever 13 has a curved slotted-guide path 24 which is arranged on an edge side, which is remote from the bearing point 4b on the bearing block 6, of the angle lever 13 (FIG. 4). A guide pin 25 of the rear locking hook 15 engages into the slotted-guide track 24, which rear locking hook 15 is positively guided by the pivoting movement of the angle lever 13.

Figure 5:
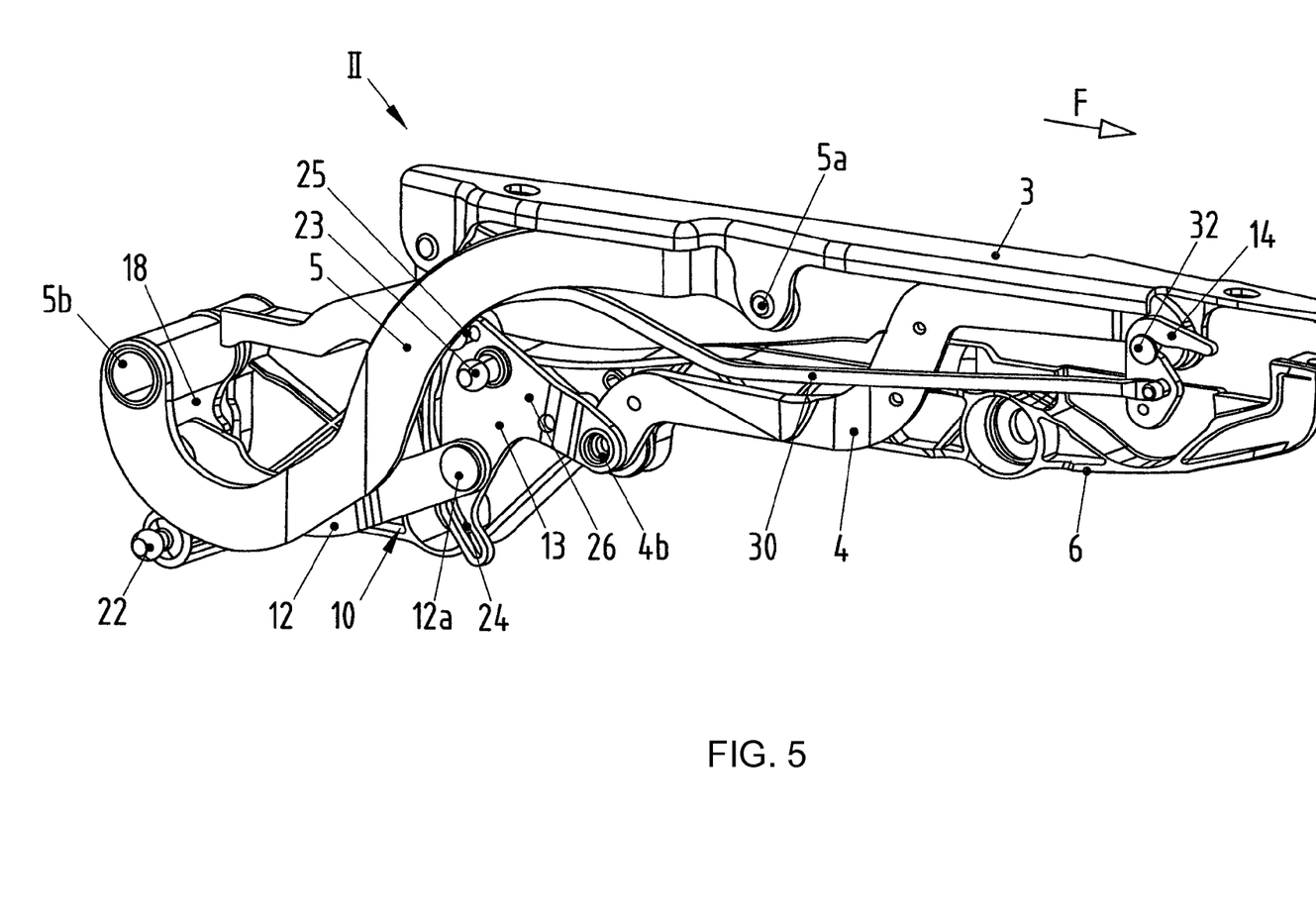
FIG. 5 is a perspective view of the hinge unit as per FIG. 4, in the closed position.

During an adjustment of the folding top compartment lid D from the closed position II into the open position I, the angle lever 13 pivots in the arrow direction 26, such that the guide pin 25 moves in the slotted-guide track 24 from an upper position (FIG. 5) into a lower position (FIG. 4) and the rear locking hook 15 and, synchronously with respect thereto, the further front locking hook 14 moves into an unlocked position as per FIG. 4.

The synchronous or superposed movement of the two locking hooks 14 and 15 is achieved by a coupling rod 30 which is connected to the two locking hooks 14, 15. In the closed position II, the two locking hooks 14, 15 engage over pins 31, 32 on the holding support 3 (FIG. 1). In the exemplary embodiment, the two locking hooks 14, 15 are moved with a slight time offset with respect to one another.

For the adjustment of the folding top compartment lid D from the closed position II into the open position I, the hydraulic actuating cylinder 21 is deployed, with the bearing point 23 for the cylinder rod 21a of the actuating cylinder 21 on the angle lever 13 lying above a point of articulation 12a for the actuating lever 12 and above the bearing point 4b on the bearing block 6. The angle lever 13 is pivoted in the arrow direction 26, with the rear setting-out lever 5, as a result of its connection to the actuating lever 12, being pivoted up together with the holding support 3 and the front setting-out lever 4 (FIG. 4). During this process, the locking hooks 14, 15 are unlocked in a manner controlled by the guide pins 25 which are guided in the slotted-guide wall 24, with the connecting coupling rod 30 generating a synchronous unlocking of the two locking hooks 14, 15. The process for the adjustment of the folding top compartment lid D from the open position I into the closed position II takes place in the reverse sequence.

For the lateral guidance of the folding top compartment lid in the transverse direction of the vehicle, a run-on wedge 28 is arranged on the side of the front setting-out lever 4, which run-on wedge 28, in the closed position II, is situated opposite a run-on surface 29 on the bearing block 6 (FIG. 3).

Arranged on the front of the bearing block 6 is a rubber bumper 20, against which the folding top compartment lid D is pulled by the locking hooks 14, 15.

The invention claimed is:

1. A folding top compartment lid for a rear-end folding top compartment for holding a stowed folding top of a cabriolet vehicle, the folding top compartment lid comprising:
    a body-side bearing blocking having a bearing point;
    a holding support with locking pins;
    four-bar hinge mechanisms, one of said four-bar hinge mechanisms disposed on each side of the folding top compartment lid for adjusting the folding top compartment lid into an unlocked open position and into a locked closed position, said four-bar hinge mechanisms disposed between said body-side bearing block and said holding support for the folding top compartment lid, said four-bar hinge mechanisms each having a rear setting out lever and a front setting out lever;
    a coupling rod;
    a locking device having two locking hooks pivotably disposed one behind the other on said body-side bearing block and connected to one another by means of said coupling rod so as to be movable synchronously or in a superposable fashion, and said locking hooks, in the locked closed position, disposed corresponding to said locking pins on said holding support, said locking hooks including a rear locking hook having a guide pin;
    a hydraulic actuating cylinder; and
    an actuating device articulatedly connected to said rear and front setting-out levers of said four-bar hinge mechanism, said actuating device coupled to said locking device, said actuating device with said rear and front setting-out levers being activated by said hydraulic actuating cylinder so as to pivot into the unlocked open and locked closed positions in such a way that the folding top compartment lid can be moved from the locked closed position into the unlocked open position and back from the unlocked open position into the locked closed position, said actuating device further having an angle lever and an actuating lever connected to said angle lever, said angle lever mounted on said bearing block at said bearing point, said angle lever of said actuating device having a curved slotted-guide track for said guide pin on said rear locking hook.

2. A folding top compartment lid for a rear-end folding top compartment for holding a stowed folding top of a cabriolet vehicle, the folding top compartment lid comprising:
    four-bar hinge mechanisms, one of said four-bar hinge mechanisms disposed on each side of the folding top compartment lid for adjusting the folding top compartment lid into an unlocked open position and into a locked closed position, said four-bar hinge mechanisms disposed between a body-side bearing block and a holding support for the folding top compartment lid, said four-bar hinge mechanisms each having a rear setting out lever and a front setting out lever;
    a locking device having locking hooks, said locking hooks include a rear locking hook having a guide pin;
    a hydraulic actuating cylinder; and
    an actuating device articulatedly connected to said rear and front setting-out levers of said four-bar hinge mechanism, said actuating device coupled to said locking device, said actuating device with said rear and front setting-out levers being activated by said hydraulic actuating cylinder so as to pivot into the unlocked open and locked closed positions in such a way that the folding top compartment lid can be moved from the locked closed position into the unlocked open position and back from the unlocked open position into the locked closed position, said actuating device further having an angle lever with a curved slotted-guide track for said guide pin on said rear locking hook.

3. The folding top compartment lid according to claim 1, wherein:
    said curved slotted-guide track has a vertically extending slotted-guide track portion and a horizontally extending slotted-guide track portion; and
    said curved slotted-guide track is disposed on an edge side of said angle lever, which is remote from said bearing point on said body-side bearing block, and in the locked closed position of said rear locking hook, said guide pin is disposed at an upper end of said vertically extending slotted-guide track portion, and in the unlocked open position, said guide pin is disposed at a lower end of said horizontally extending slotted-guide track portion.

4. The folding top compartment lid according to claim 1, wherein said rear setting-out lever of said four-bar hinge mechanism has, at its free end which is remote from said holding support, a fork head which is articulatedly connected so as to be pivotable about an axis in said body-side bearing block, and a fork arm pivotably connected to said actuating lever of said actuating device, said fork arm is articulatedly connected to said angle lever at a bearing point.

5. The folding top compartment lid according to claim 1, wherein said hydraulic actuating cylinder has a deployable cylinder rod, said hydraulic actuating cylinder is supported on said body-side bearing block in a positionally fixed manner at a bearing point and is connected via said deployable cylinder rod to said angle lever at a bearing point.

6. The folding top compartment lid according to claim 5, wherein in the locked closed position, said bearing point for said hydraulic actuating cylinder on said angle lever lies above a point of articulation of said actuating lever on said angle lever and—in relation to a direction of travel—behind a point of articulation of said front setting-out lever, which is at the same time a point of articulation of said angle lever on said body-side bearing block.

7. The folding top compartment lid according to claim 1, further comprising a run-on wedge disposed on said front setting-out lever, said run-on wedge, in the locked closed position, is situated opposite a corresponding run-on surface on said bearing block.

8. The folding top compartment lid according to claim 1, wherein said locking hooks include a front locking hook; and
wherein in the locked closed position, said front and rear setting-out levers are disposed so as to partially lie one above the other, and to move into the unlocked open position, said angle lever can be rotated about said bearing point on said body-side bearing block by means of said hydraulic actuating cylinder so as to drive said actuating lever and said rear setting-out lever, and said rear locking hook is configured such that it can be unlocked, or locked in order to assume the locked closed position, while synchronously driving said front locking hook via said coupling rod.

9. The folding top compartment lid according to claim 1, wherein said body-side bearing block has an end side with a support block; and
further comprising a rubber bumper disposed on said support block on said end side of said bearing block, said rubber bumper faces toward said holding support and the folding top compartment lid.

10. The folding top compartment lid according to claim 1, wherein in the locked closed position of the folding top compartment lid, a common point of articulation of said actuating lever and said angle lever lies a short distance below an extension position, with the extension position being formed by a straight line which connects said bearing points to one another, as a result of which the locking/unlocking and an actuation of the folding top compartment lid are decoupled.

11. The folding top compartment lid according to claim 1, further comprising an integrated engine bay lid for a motor vehicle.

\* \* \* \* \*